(12) United States Patent
Juman (10) Patent No.: US 9,324,345 B2
(45) Date of Patent: Apr. 26, 2016

(54) SUSPENSION ASSEMBLY AND DISK DRIVE WITH THE SAME

(71) Applicant: Kabushiki Kaisha Toshiba, Minato-ku, Tokyo (JP)

(72) Inventor: Shigeru Juman, Kawasaki Kanagawa (JP)

(73) Assignee: Kabushiki Kasiha Toshiba, Minato-Ku, Tokyo (JP)

( * ) Notice: Subject to any disclaimer, the term of this patent is extended or adjusted under 35 U.S.C. 154(b) by 15 days.

(21) Appl. No.: 14/533,773

(22) Filed: Nov. 5, 2014

(65) Prior Publication Data

US 2016/0019918 A1 Jan. 21, 2016

Related U.S. Application Data

(60) Provisional application No. 62/026,868, filed on Jul. 21, 2014.

(51) Int. Cl.
*G11B 5/48* (2006.01)

(52) U.S. Cl.
CPC ............ *G11B 5/4826* (2013.01); *G11B 5/4846* (2013.01); *G11B 5/4853* (2013.01); *G11B 5/486* (2013.01)

(58) Field of Classification Search
USPC .................................. 360/245.8–245.9, 264.2
See application file for complete search history.

(56) References Cited

U.S. PATENT DOCUMENTS

| | | | | |
|---|---|---|---|---|
| 5,668,684 A | * | 9/1997 | Palmer et al. ............... | 360/264.2 |
| 5,691,861 A | * | 11/1997 | Ohba .......................... | 360/245.8 |
| 6,075,674 A | * | 6/2000 | Aoyagi et al. ............. | 360/245.8 |
| 6,154,344 A | * | 11/2000 | Marek ......................... | 360/264.2 |
| 6,751,066 B1 | * | 6/2004 | Warmka et al. ............ | 360/245.8 |
| 7,457,083 B2 | * | 11/2008 | Naoki et al. ............... | 360/245.9 |
| 7,894,164 B2 | * | 2/2011 | Hur ............................. | 360/245.4 |
| 8,064,168 B1 | * | 11/2011 | Zhang et al. ............... | 360/245.4 |
| 8,120,878 B1 | * | 2/2012 | Drape et al. ............... | 360/244.9 |
| 2004/0240118 A1 | * | 12/2004 | Hayakawa et al. ........ | 360/264.2 |

FOREIGN PATENT DOCUMENTS

| | | | |
|---|---|---|---|
| JP | 2001-319442 A | 11/2001 | |
| JP | 3909305 B2 | 4/2007 | |
| JP | 4179728 B2 | 11/2008 | |

* cited by examiner

*Primary Examiner* — Carlos E Garcia

(74) *Attorney, Agent, or Firm* — White & Case LLP (57) ABSTRACT

According to one embodiment, a suspension assembly includes a base plate having a securing plate portion protruding outwardly from a side edge of the base plate, a load beam secured on a first surface of the base plate and extending from the base plate, and a wiring member. The wiring member includes a distal side portion attached to the load beam and the first surface of the base plate, and a proximal side portion extending outwardly from the side edge of the base plate and extending in a direction opposite to the load beam along the support surface.

9 Claims, 12 Drawing Sheets

SUSPENSION ASSEMBLY AND DISK DRIVE WITH THE SAME

CROSS-REFERENCE TO RELATED APPLICATIONS

This application claims the benefit of U.S. Provisional Application No. 62/026,868, filed Jul. 21, 2014, the entire contents of which are incorporated herein by reference.

FIELD

Embodiments described herein relate generally to a suspension assembly and a disk drive with the same.

BACKGROUND

A magnetic disk drive as an example of a disk apparatus generally comprises a magnetic disk contained in a housing, a magnetic head configured to record information to and read information from the magnetic disk, and a suspension assembly configured to support the magnetic head. The suspension assembly comprises a suspension attached to a distal end portion of an arm, and a belt-shaped wiring member (flexure) provided on the suspension and extending outwardly from the suspension. The wiring line of the wiring member is electrically connected to the magnetic head. The suspension comprises a load beam, and a base plate secured to a proximal end side of the load beam. The base plate is fixed to the distal end portion of the arm.

In the above-described suspension assembly, the wiring member is constituted by a thin laminate, and is extended from the load beam to a side of the suspension and arranged in a groove of the arm. The wiring member is greatly influenced by wind generated by rotation of the magnetic disk due to its thinness. In other words, the wiring member may be rocked by wind disturbance, the suspension may be rocked as a whole, and positioning accuracy of the magnetic head may be worsened.

DETAILED DESCRIPTION

Various embodiments will be described hereinafter with reference to the accompanying drawings. In general, according to one embodiment, a suspension assembly comprises: a base plate comprising a first surface, a second surface opposite to the first surface, a side edge, and a securing plate portion protruding outwardly from the side edge, the securing plate portion being formed in a stepped shape to be bent to the second surface side along the side edge, and including a support surface displaced to the second surface side and extending substantially parallel to the first surface; a load beam comprising a proximal portion secured on the first surface of the base plate, and extending from the base plate; and a wiring member comprising a plurality of wiring lines electrically connected to a head, a distal end portion attached to the load beam and the first surface of the base plate, and a proximal side portion extending outwardly from the side edge of the base plate and extending to a direction opposite to the load beam along the support surface.

Hard disk drives (HDDs) of the embodiments will be hereinafter described in detail as disk apparatuses.

First Embodiment

Figure 1:
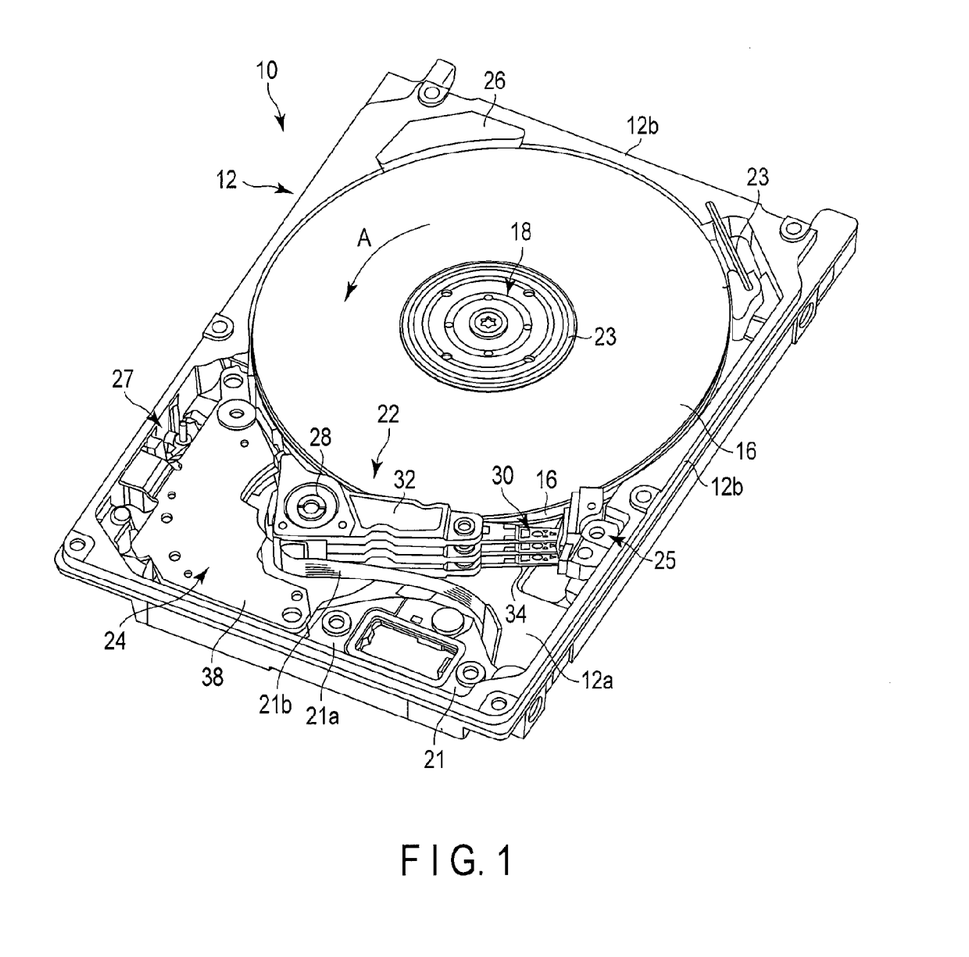
FIG. 1 is a perspective view showing a hard disk drive (HDD) according to a first embodiment, with its top cover removed.

FIG. 1 shows an internal structure of an HDD with its top cover removed. As shown in FIG. 1, the HDD comprises a housing 10. The housing 10 comprises an open-topped rectangular box-shaped base 12, and a top cover (not shown) secured to the base 12 with a plurality of screws to close an upper end opening of the base 12. The base 12 includes a rectangular bottom wall 12a and a sidewall 12b extending upright along a periphery of the bottom wall 12a.

The housing 10 contains three magnetic disks 16 serving as storage media, and a spindle motor 18 serving as a driving unit which supports and rotates the magnetic disks 16. The spindle motor 18 is provided on the bottom wall 12a. Each magnetic disk 16 is formed to have a diameter of, for example, 65 mm (2.5 inches), and comprises magnetic recording layers on its upper and lower surfaces. Each magnetic disk 16 is engaged coaxially with a hub (not shown) of the spindle motor 18, and is clamped by a clamp spring 23 to be secured to the hub. Each magnetic disk 16 is thereby supported to be positioned parallel to the bottom wall 12a of the base 12. The magnetic disks 16 are rotated at a predetermined speed by the spindle motor 18. The housing 10 contains a plurality of magnetic heads 17 that record information on and read information from the magnetic disks 16, and a head stack assembly (HSA) 22 that supports the magnetic heads 17 to be freely movable relative to the magnetic disks 16. The housing 10 further contains a voice coil motor (hereinafter referred to as VCM) 24 which rotates and positions the HSA 22, a ramp load mechanism 25 which holds the magnetic heads 17 at an unloaded position remote from the magnetic disks 16 when the magnetic heads 17 are moved to an outermost periphery of the magnetic disks 16, a latch mechanism 27 which holds the HSA 22 in a retracted position when impulse and the like are applied to the HDD, and a board unit 21 which is provided with electronic components such as a conversion connector.

The latch mechanism 27 is not limited to a mechanical latch, but a magnetic latch may be employed as the latch mechanism.

A printed circuit board (not shown) is screwed to an outer surface of the bottom wall 12a of the base 12. The printed circuit board controls operations of the spindle motor 18, VCM 24, and magnetic heads 17 through the board unit 21. A circulation filter 23 which traps dust generated in the housing 10 by movement of movable elements is provided outside the magnetic disks 16, in vicinity of the sidewall 12b of the base 12. In addition, a breather filter 15 which traps dust from the aerial flowing into the housing 10 is provided in close vicinity of the sidewall 12b of the base 12.

Figure 2:
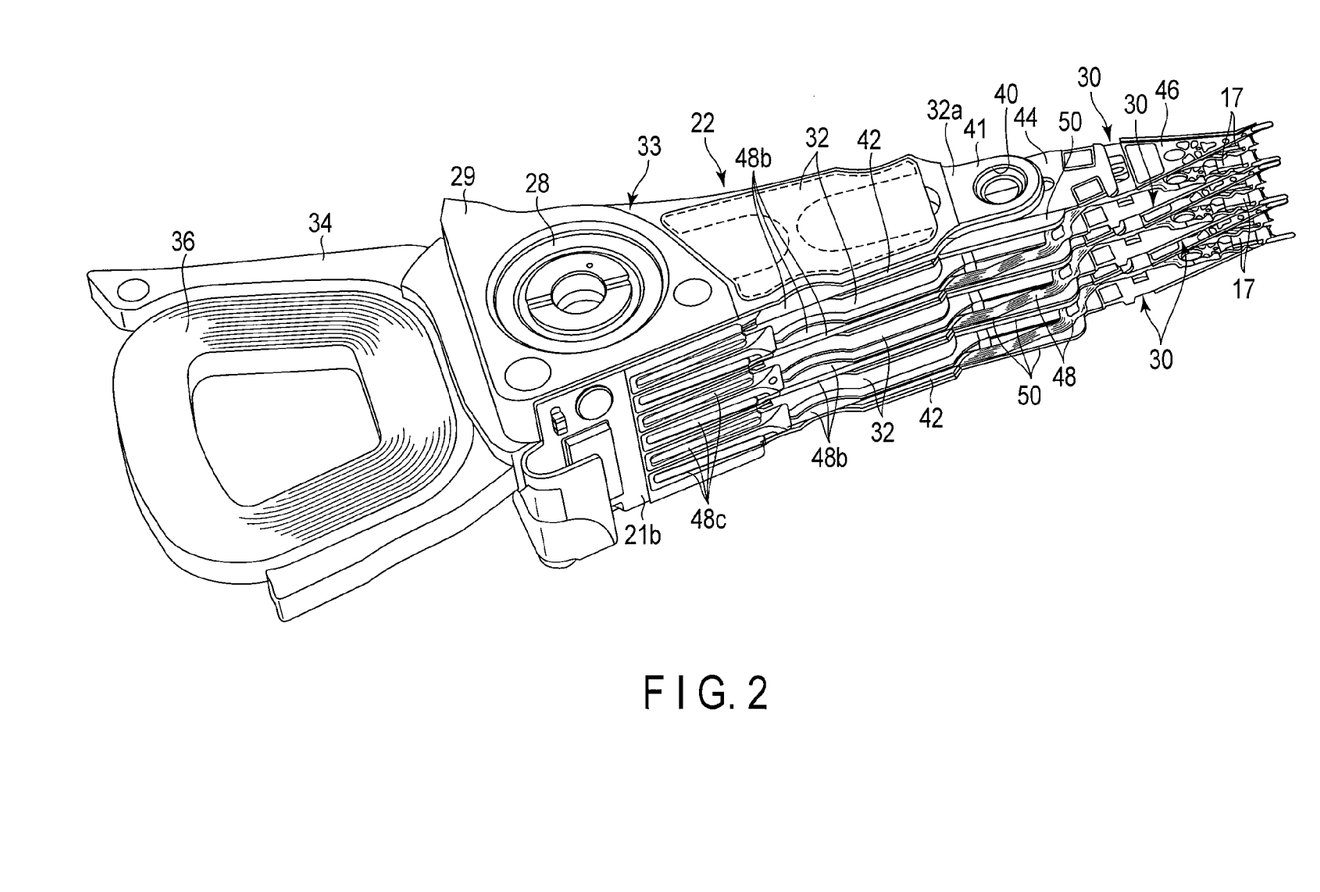
FIG. 2 is a perspective view showing a head stack assembly (HSA) of the HDD.

FIG. 2 is a perspective view showing the HSA 22. As shown in FIG. 1 and FIG. 2, the HSA 22 comprises a bearing unit 28 with a rotatable sleeve 29, four arms 32 that extend from the sleeve 29, a suspension assembly 30 that is attached to each of the arms 32, and the magnetic head 17 supported at the suspension assembly 30. The bearing unit 28 comprises a pivot shaft which is provided upright on the bottom wall 12a of the base 12, in vicinity of the outer peripheral edges of the magnetic disks 16, and the cylindrical sleeve 29 supported by the pivot shaft so as to be freely rotatable via bearings. The HSA 22 is thereby supported on the bottom wall 12a to be rotatable around the pivot shaft of the bearing unit 28.

In the present embodiment, four arms 32 are formed integrally with the sleeve 29 to constitute an actuator block or an E block 33. Four arms 32 are formed in a shape of an elongated flat plate of, for example, a stainless steel, aluminum, etc. and extend from the sleeve 29 in a direction orthogonal to the pivot shaft of the bearing unit 28. Four arms 32 extend parallel to each other, and face each other with predetermined intervals. The plural arms 32 may be formed independently of each other and may be layered on the bearing unit 28.

The HSA 22 comprises a support frame 34 which extends from the sleeve 29 in a direction opposed to the arms 32, and a voice coil 36 forming a part of the VCM 24 is supported by the support frame 34. The voice coil 36 is positioned between a pair of yokes 38 secured to the base 12, and constitutes the VCM 24 together with the yokes 38 and a magnet secured to either of the yokes 38.

Figure 3:
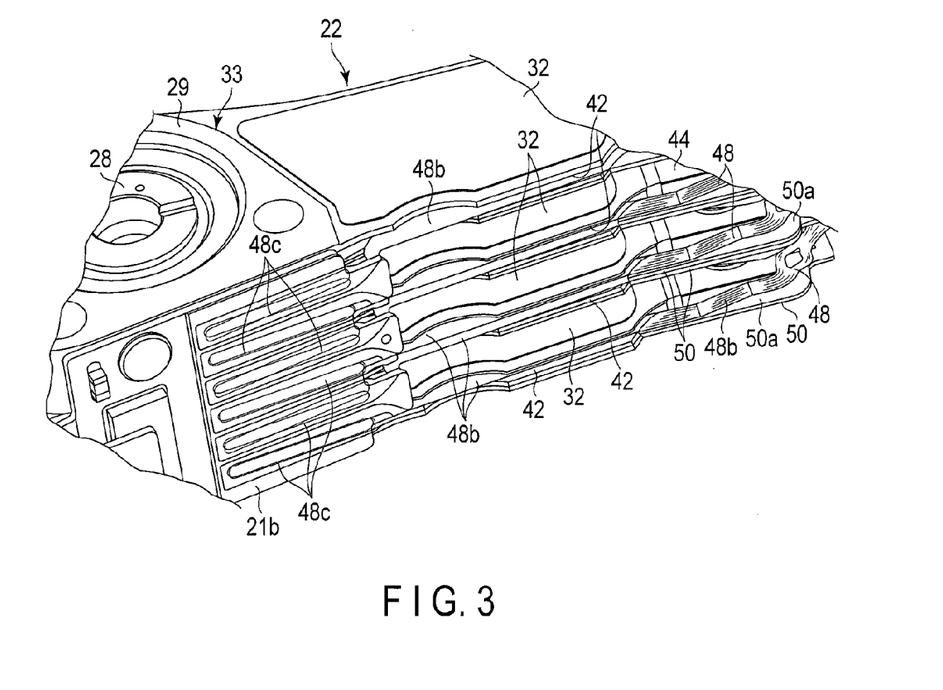
FIG. 3 is a perspective view showing a proximal end portion of an arm of the HSA.
Figure 4:
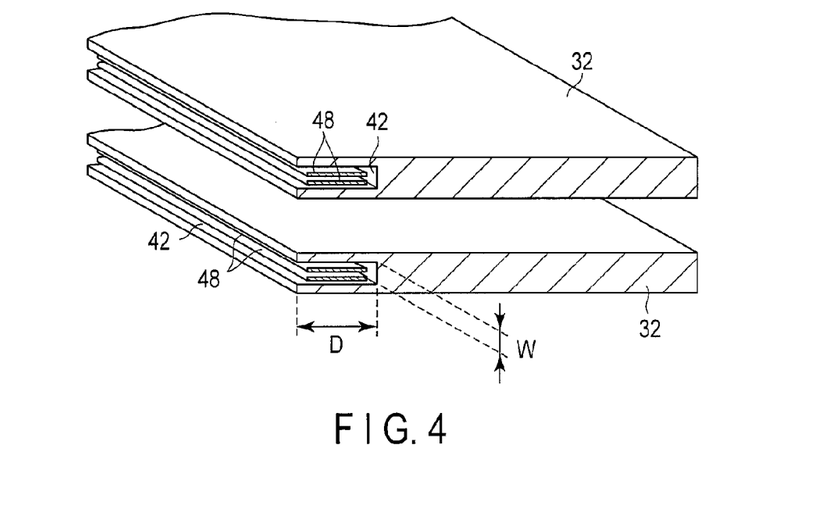
FIG. 4 is a perspective cutaway view showing the arm.
Figure 5:
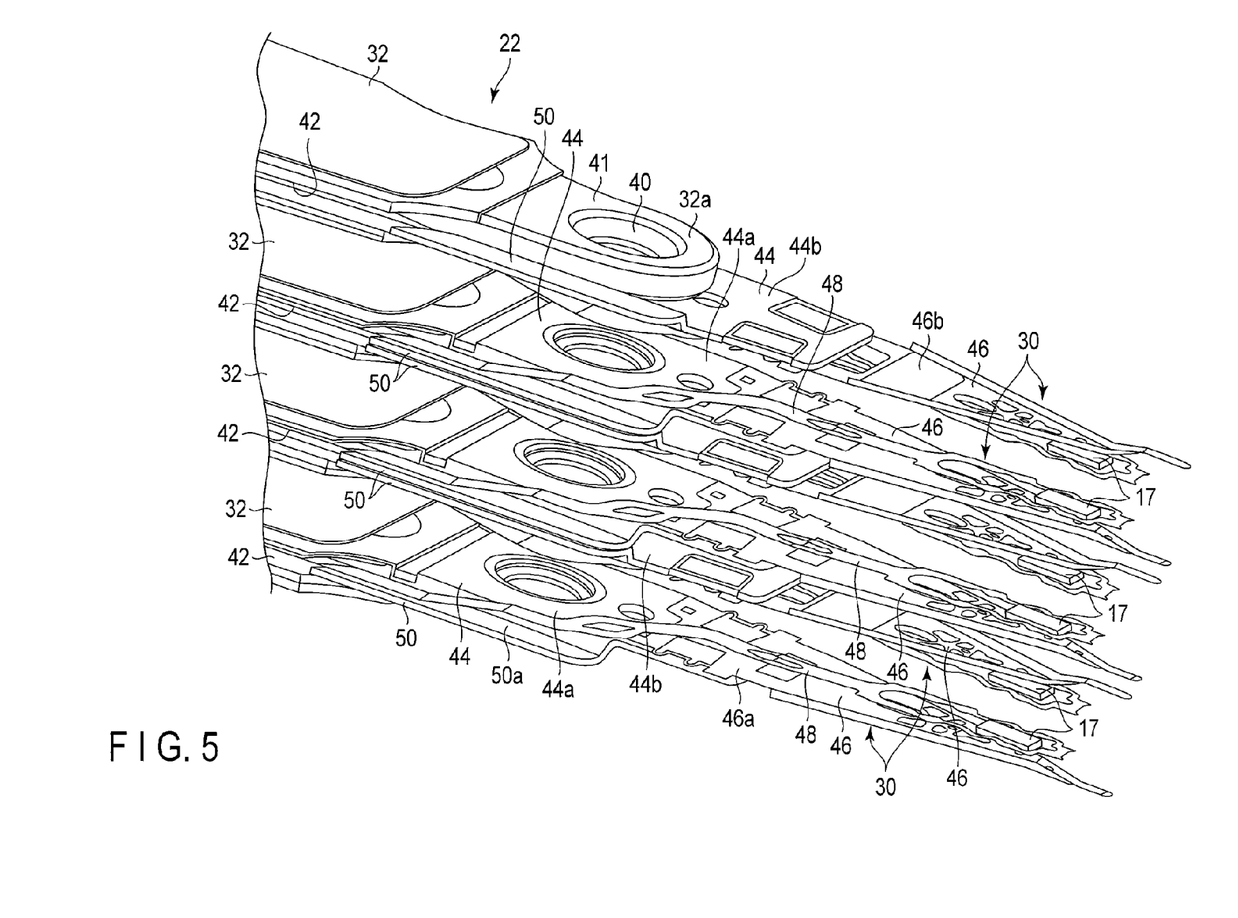
FIG. 5 is a perspective view showing a distal end portion of the arm and a suspension assembly, of the HSA.

FIG. 3 is an expanded perspective view showing the arm portion of the HSA 22. FIG. 4 is a perspective cutaway view showing the arm. FIG. 5 is a perspective view showing a distal end portion of the arm, and the suspension assembly.

As shown in FIG. 2 and FIG. 5, each arm 32 comprises a distal end portion 32a on an extending end side, and a seat surface 41 having a circular swaging hole 40 is formed on each of upper and lower surfaces of the distal end portion 32a. In addition, each arm 32 comprises a slot (or groove) 42 formed along one of its side edges as shown in FIG. 3 to FIG. 5. The slot 42 extends from a proximal end to the distal end portion 32a, of the arm 32. The slot 42 opens at a side edge of the arm 32, and has a predetermined width W and a predetermined depth D. The depth D is equal to or greater than a width of the wiring member to be described later, and the width W is at least equal to or greater than a double thickness of the wiring member. One or two wiring members can be thereby inserted into the slot 42 of the arm 32.

Figure 6:
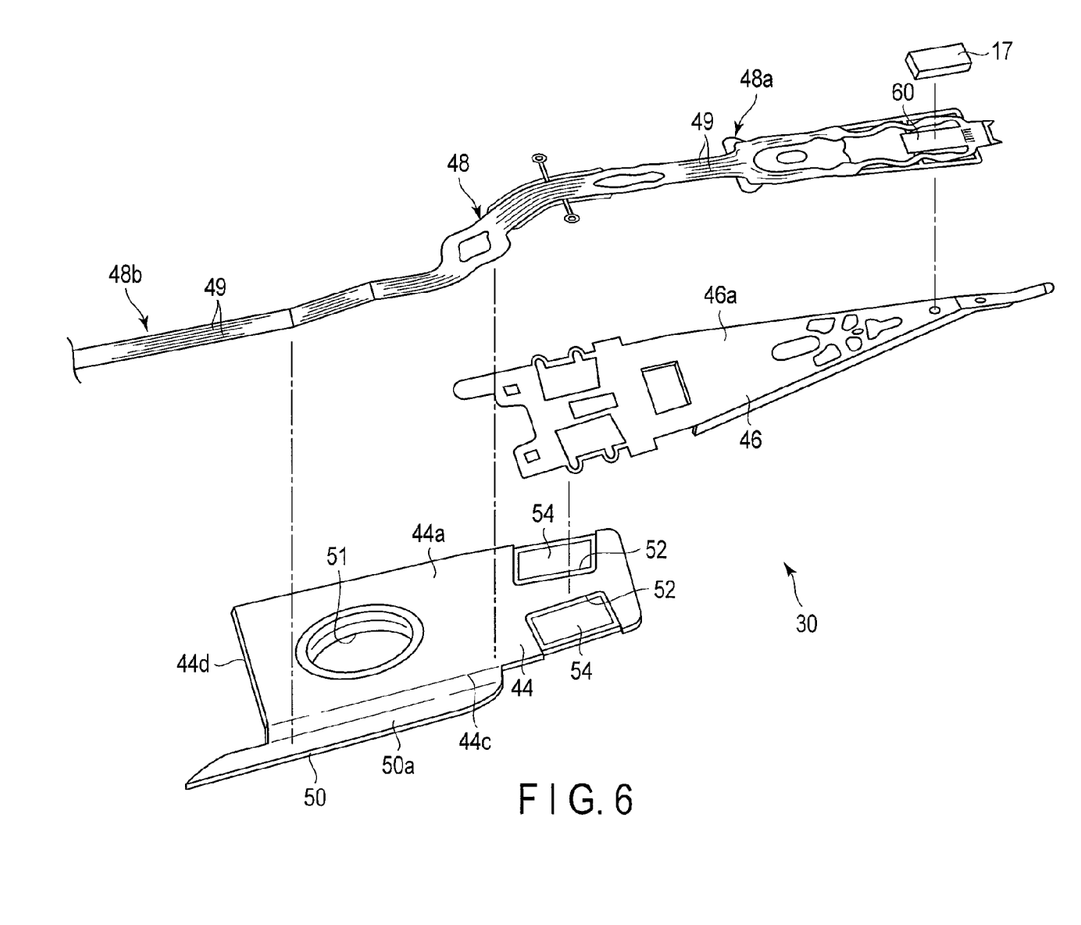
FIG. 6 is an exploded perspective view showing the suspension assembly.
Figure 7:
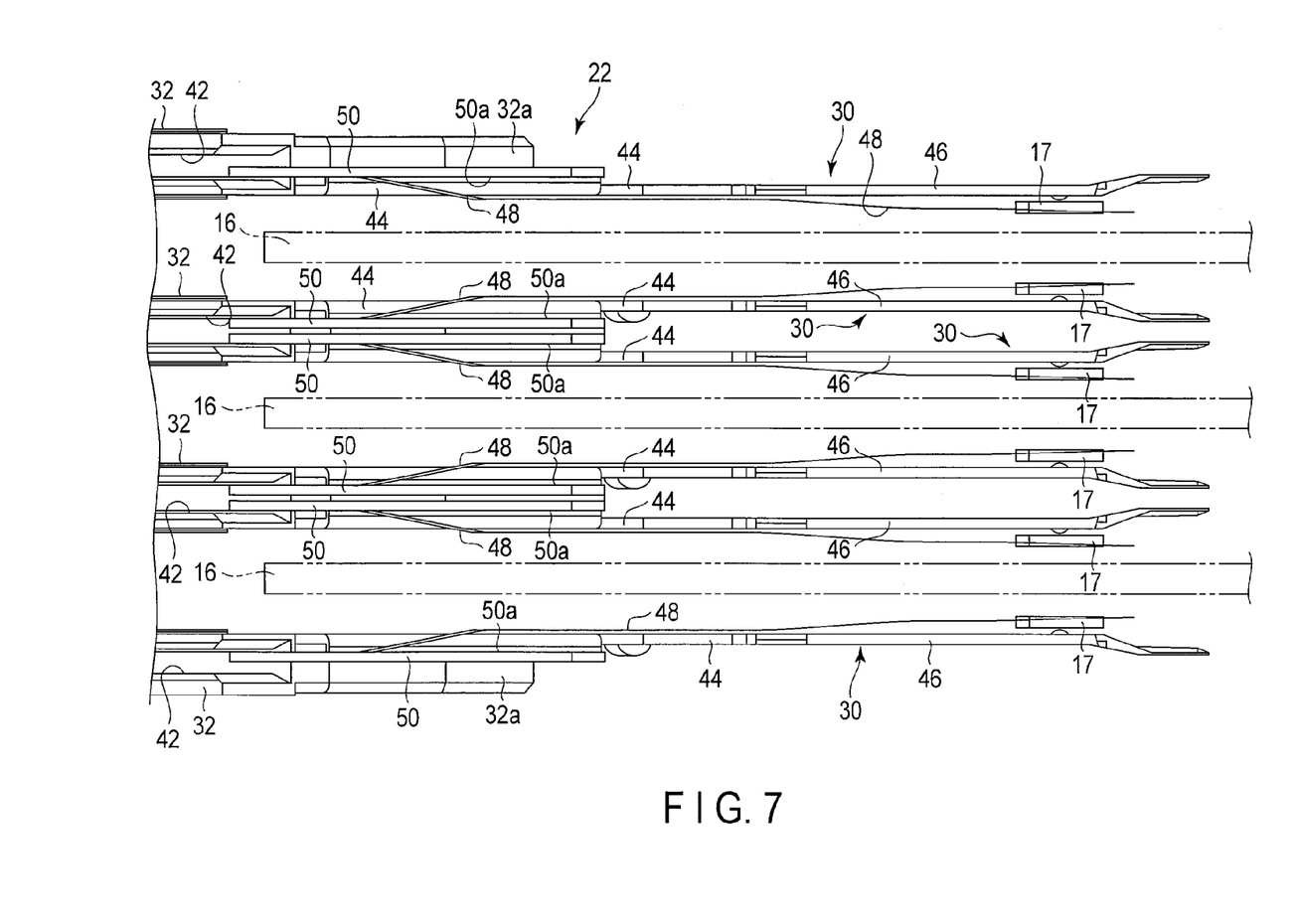
FIG. 7 is a side view showing the distal end portion of the arm and the suspension assembly, of the HSA.
Figure 8:
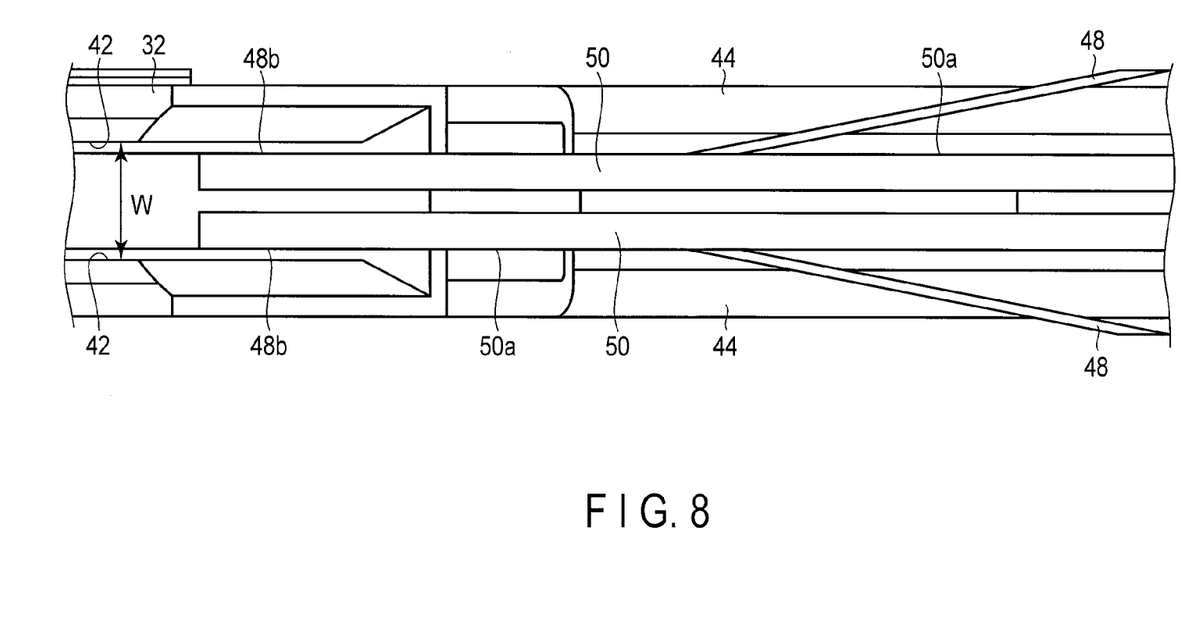
FIG. 8 is an enlarged side view showing a positional relationship between a securing plate portion of the suspension assembly and a slot of the arm.

FIG. 6 is an exploded perspective view showing the suspension assembly 30. FIG. 7 is a side view showing the suspension assembly portion of the HSA 22. FIG. 8 is an enlarged side view showing a positional relationship between a securing plate portion of the suspension assembly and the slot of the arm. The suspension assembly 30 comprises a substantially rectangular base plate 44, a load beam 46 formed of an elongated leaf spring, and a flexure (wiring member) 48 shaped in an elongated belt, as shown in FIG. 5 and FIG. 6. The load beam 46 has its proximal end portion superposed and secured on an end portion of the base plate 44. The load beam 46 extends from the base plate 44 and is formed to taper toward the extending end. The base plate 44 and the load beam 46 are formed of, for example, stainless steel. The base plate 44 has a thickness of, for example, 150 μm and the load beam 46 has a thickness of, for example, 25 to 30 μm.

The base plate 44 has a first surface 44a, and a second surface 44b serving as a securing surface at a side opposite to the first surface. The base plate 44 also has a side edge 44c and a rear edge 44d. The base plate 44 comprises a circular opening at its proximal end portion, and an annular protruding portion 51 positioned around a periphery of the opening. The protruding portion 51 protrudes from the second surface 44b of the base plate 44. The second surface 44b side of the proximal end portion of the base plate 44 is superposed on the seat surface 41 of the distal end portion 32a of the arm 32. The base plate 44 is fastened to the distal end portion 32a of the arm 32 by fitting the protruding portion 51 of the base plate 44 in the swaging hole 40 formed at the arm 32 and swaging the protruding portion 51. The first surface 44a of the base plate 44 is positioned at a side opposite to the surface of the magnetic disk 16.

The base plate 44 integrally comprises an elongated securing plate portion 50 protruding from the side edge 44c. The securing plate portion 50 extends along the side edge 44c and protrudes toward the arm 32 side over the rear edge 44d of the base plate 44. The securing plate portion 50 is formed to be stepped, i.e., bent in an L-letter shape. The securing plate portion 50 is bent at substantially right angles to the second surface 44b side along the side edge 44c of the base plate 44, and further bent outwardly at right angles so as to be parallel to the base plate 44. The securing plate portion 50 is thereby provided along the side edge 44c, and has a flat support surface 50a displaced by one step to the second surface 44b side from the first surface 44a. The support surface 50a extends substantially parallel to the first surface 44a of the base plate 44, and also extends in a direction opposite to the load beam 46 over the rear edge 44d of the base plate 44.

In the present embodiment, a pair of rectangular openings 52 are formed at both side portions of the end portion of the load beam 46 on the side of the base plate 44. Each opening 52 is opened to both surfaces and side edges of the base plate 44. Piezoelectric elements 54 are arranged in the openings 52, respectively, and fixed in the openings 48 by an adhesive 58. The piezoelectric elements 54 are formed in, for example, a rectangular plate shape, and are arranged substantially parallel to the surface of the base plate 44.

Each load beam 46 has a first surface 46a and a second surface 46b at an opposite side to the first surface as shown in FIG. 5 and FIG. 6. A proximal end portion of the load beam 46 is arranged to have the second surface 46b side superposed on the first surface 44a side of the distal end portion of the base plate 44, and is fixed to the base plate 44 by welding at a plurality of portions of the proximal end portion. The first surface 46a of the load beam 46 is opposed to the surface of the magnetic disk 16. A width of the proximal end portion of the load beam 46 is formed to be substantially equal to a width of the base plate 44. In addition, the load beam 46 is partially superposed on both end portions in the longitudinal direction of the piezoelectric elements 54 and is bonded to the piezoelectric elements 54 by an adhesive, etc.

The HSA 22 comprises six suspension assemblies 30 as shown in FIG. 7. The base plate 44 of the uppermost suspension assembly 30 is secured to a seat surface at a lower surface side of the distal end portion 32a of the uppermost arm 32. The base plates 44 of the suspension assemblies 30 are secured to both upper and lower seat surfaces 41 of the distal end portion 32a, respectively, at each of the second and third upper arms 32. Furthermore, the base plate 44 of the suspension assembly 30 is secured to the seat surface at the upper surface side of the distal end portion 32a of the lowermost arm 32.

Six suspension assemblies 30 extend from four arms 32, and are arranged side by side, so as to face substantially parallel to each other, with predetermined intervals. The suspension assembly 30 secured to the uppermost arm 32 and the suspension assembly 30 secured to the seat surface at the upper surface side of the second upper arm 32 are positioned parallel to each other with a predetermined interval, and the magnetic heads 17 supported on the respective suspension assemblies 30 are positioned to face each other. The magnetic heads 17 are positioned to face both surfaces of the uppermost magnetic disk 16.

The suspension assembly 30 secured to the seat surface at the lower surface side of the second upper arm 32 and the suspension assembly 30 secured to the seat surface at the upper surface side of the third upper arm 32 are positioned parallel to each other with a predetermined interval, and the magnetic heads 17 supported on the respective suspension assemblies 30 are positioned to face each other. The magnetic heads 17 are positioned to face both surfaces of the second upper magnetic disk 16.

The suspension assembly 30 secured to the seat surface at the lower surface side of the third upper arm 32 and the suspension assembly 30 secured to the seat surface at the upper surface side of the lowermost arm 32 are positioned parallel to each other with a predetermined interval, and the magnetic heads 17 supported on the respective suspension assemblies 30 are positioned to face each other. The magnetic heads 17 are positioned to face both surfaces of the lowermost magnetic disk 16.

As shown in FIG. 5, FIG. 7, and FIG. 8, the support surface 50a of the securing plate portion 50 is extended to a close vicinity of the slot 42 of the arm 32 and is positioned substantially parallel to the slot 42, sequentially with the slot 42, while the base plate 44 is secured to the distal end portion 32a of the arm 32. Furthermore, the support surface 50a is positioned at a height which falls within a range of a width W of the slot 42.

As shown in FIG. 5 and FIG. 6, the flexure 48 of the suspension assembly 30 comprises a thin metal plate (backing layer) formed of stainless steel, etc., which serves as a base, an insulation layer formed on the thin metal plate, a conductive layer (wiring pattern) which constitutes a plurality of wiring lines 49 formed on the insulation layer, and a protective layer (insulation layer) covering the conductive layer, and forms a laminate shaped in an elongated belt.

The flexure 48 comprises a distal side portion 48a attached to the first surface 46a of the load beam 46 and to the first surface 44a of the base plate 44, and a proximal side portion 48b which extends outwardly from the side edge 44c of the base plate 44 and which further extends to the proximal end portion of the arm 32, along the arm 32 and the side edge 44c of the base plate 44. The flexure 48 comprises a gimbal portion (elastic support portion) 60 which can be freely displaced, at its distal end portion, and the magnetic head 17 is mounted on the gimbal portion 60. The wiring lines 49 are electrically connected to the magnetic head 17. In addition, some of the wiring lines 49 are electrically connected to the piezoelectric elements 54.

The flexure 48 has its thin metal plate side bonded or pivot-welded on the first surface 46a of the load beam 46 and on the first surface 44a of the base plate 44. The distal side portion 48a of the flexure 48 extends from the magnetic head 17 to the proximal end of the load beam 46 through a center of the load beam 46, and further extends outwardly from the side edge 44c of the base plate 44 over the first surface 44a of the base plate 44.

After the proximal side portion 48b of the flexure 48 extends outwardly from the side edge 44c of the base plate 44, the proximal end portion extends toward the arm 32 side along the side edge 44c and is positioned to face the support surface 50a of the securing plate portion 50, as shown in FIG. 5 to FIG. 8. The proximal side portion 48b is tilted and extended from a height of the first surface 44a of the base plate 44 to the support surface 50a, and is further led into the slot 42 of the arm 32 over the support surface 50a. The proximal side portion 48b may be bonded or spot-welded on the support surface 50a.

As shown in FIG. 2 and FIG. 3, the proximal side portion 48b of the flexure 48 extends to the proximal end of the arm 32 through the slot 42 of the arm 32. A connection end portion 48c of the flexure 48 positioned at the distal end of the proximal side portion 48b is connected to a main FPC 21b to be described later.

A plurality of wiring lines 49 of the flexure 48 extend along a substantially full length of the flexure 48, each having an end connected electrically to the magnetic head 17 and the other end connected to a connection terminal (connection pad) provided at the connection end portion 48c. In addition, each of some of the wiring lines 49 has an end connected to the piezoelectric element 54 and the other end connected to the connection terminal of the connection end portion 48c. The magnetic head 17 and the piezoelectric element 54 are electrically connected to the main FPC 21b and the board unit 21 through the wiring lines 49 of the flexure 48.

In a state in which the HSA 22 constituted as described above is incorporated on the base 12, a lower end portion of the pivot shaft of the bearing unit 28 is secured on the base 12 to stand substantially parallel to the spindle of the spindle motor 18, as shown in FIG. 1. Each magnetic disk 16 is positioned between two suspension assemblies 30. At the operation of the FDD, the magnetic heads 17 attached to the suspension assemblies 30 are opposed to the upper surfaces and lower surfaces of the magnetic disks 16.

The board unit 21 comprises a main body 21a formed by a flexible printed circuit board, and the main body 21a is secured to the bottom wall 12a of the base 12. An electronic component (not shown) such as a conversion connector is mounted on the main body 21a. A connector (not shown) for connection with the printed circuit board is mounted on the bottom surface of the main body 21a.

The board unit 21 comprises a main flexible printed circuit board (hereinafter referred to as main FPC) 21b extending from the main body 21a. An extending end of the main FPC 21b constitutes a connection end portion and is secured in close vicinity of the bearing unit 28 of the HSA 22. The flexure 48 of each of the suspension assemblies 30 is connected to the connection end portion of the main FPC 21b, mechanically and electrically. The board unit 21 is thereby electrically connected to the magnetic heads 17 and the piezoelectric elements 54 via the main FPC 21b and the flexure 48.

According to the HDD and the suspension assemblies 30 constituted as described above, rocking of the flexure 48 caused by wind disturbance which occurs due to the rotation of the magnetic disks 16 can be suppressed, and the positioning accuracy of the magnetic head can be improved. In other words, the base plate 44 of each suspension assembly 30 comprises the securing plate portion 50 protruding from the side edge 44c of the base plate, and the securing plate portion 50 has the support surface 50a lowered by one step than the first surface 44a of the base plate 44. The support surface 50a is positioned within the range of the width of the slot 42 of the arm 32, and extends in close vicinity of the slot 42 or into the slot 42, sequentially with the slot 42. The portion of the flexure 48, which extends outwardly from the base plate 44, is opposed to the support surface 50a and is led to the slot 42 along the support surface 50a. The securing plate portion 50 thereby functions as a wind shield for the portion of the flexure 48 which extends from the surface of the base plate 44 into the slot 42, and also functions as a guide which guides the flexure 48 to the slot 42 of the arm 32. By removing a gap between the support surface 50a of the securing plate portion 50 and the slot 42, an aerial wiring portion of the flexure 48 does not need to be provided and a wind influence on the flexure 48 from the rotating magnetic disks can be reduced. Degradation of the positioning accuracy of the magnetic heads resulting from vibration of the flexure can be thereby prevented. By arranging the proximal side portion 48b of the flexure 48 inside the slot 42 of the arm 32, the arm 32 itself can function as a wind shield and can prevent the vibration of the flexure 48.

Figure 9:
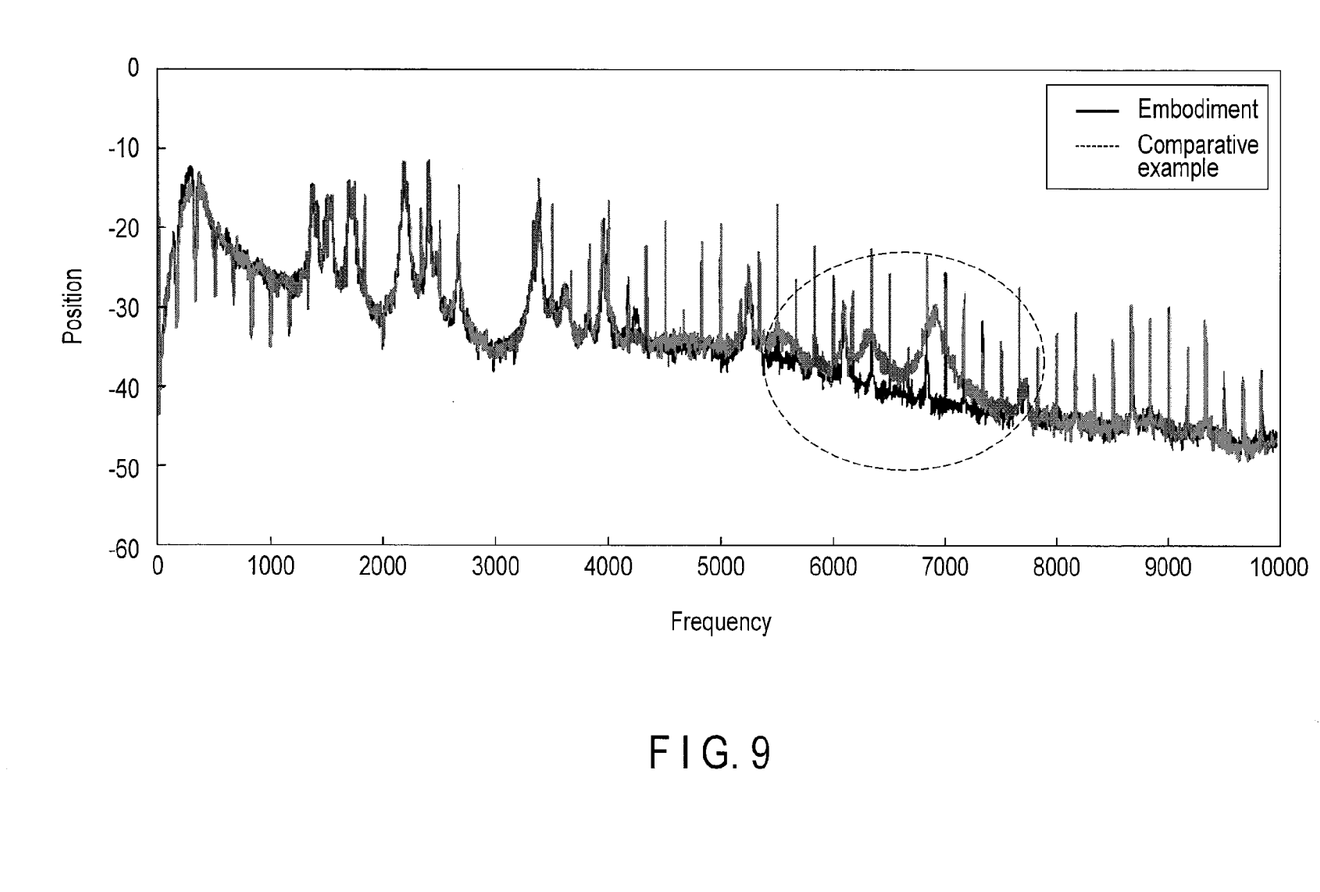
FIG. 9 is a graph showing a relationship between a positioning signal spectrum and a vibration amplitude, in the suspension assembly of the first embodiment and a suspension assembly of a comparative example.

FIG. 9 shows a comparison between positioning signal spectra obtained from frequency-analyzed positioning signals of the magnetic head, in the suspension assembly of the present embodiment and a suspension assembly of a comparative example. The base plate is assumed to have no securing plate portion, in the suspension assembly of the comparative example. It can be understood from the figure that in the suspension assembly of the present embodiment, as compared with the comparative example, torsional resonance of the suspension occurring at the frequency in a range of approximately 6,000 to 8,000 Hz, which results from the vibration of the flexure, is suppressed and the signal amplitude is reduced remarkably. The suspension assembly has a resonance in the frequency band as a shape property. In the suspension assembly of the comparative example, its vibration is stressed due to the wind disturbance and appears on the positioning signal.

According to the present embodiment, based on the above, the suspension assembly and disk device capable of suppressing the rocking of the wiring member caused by the wind disturbance and of attempting the increase in positioning accuracy of the head can be provided. In addition, the wiring member can be easily inserted into the slot provided at the arm and the operation efficiency of assembling the disk device can be improved, by the securing plate portion.

Next, a suspension assembly of an HDD according to another embodiment will be described. In another embodiment to be described below, portions like or similar to those of the above-described First Embodiment are denoted by similar reference numbers and their detailed descriptions are omitted, and portions different from those of the First Embodiment will be mainly described in detail.

Second Embodiment

Figure 10:
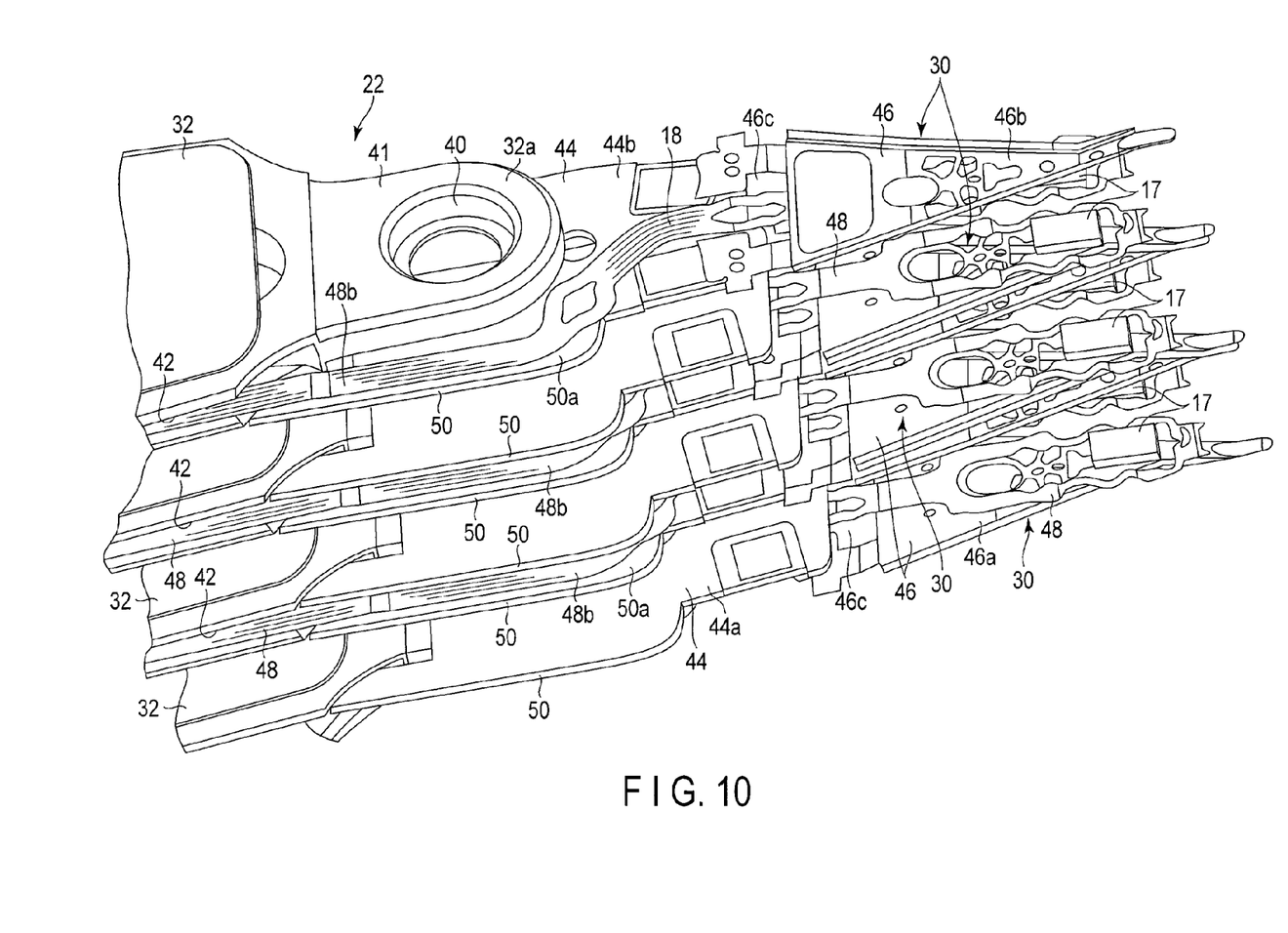
FIG. 10 is a perspective view showing a distal end portion of an arm of a head stack assembly (HSA), and a suspension assembly, in an HDD of a second embodiment.
Figure 11:
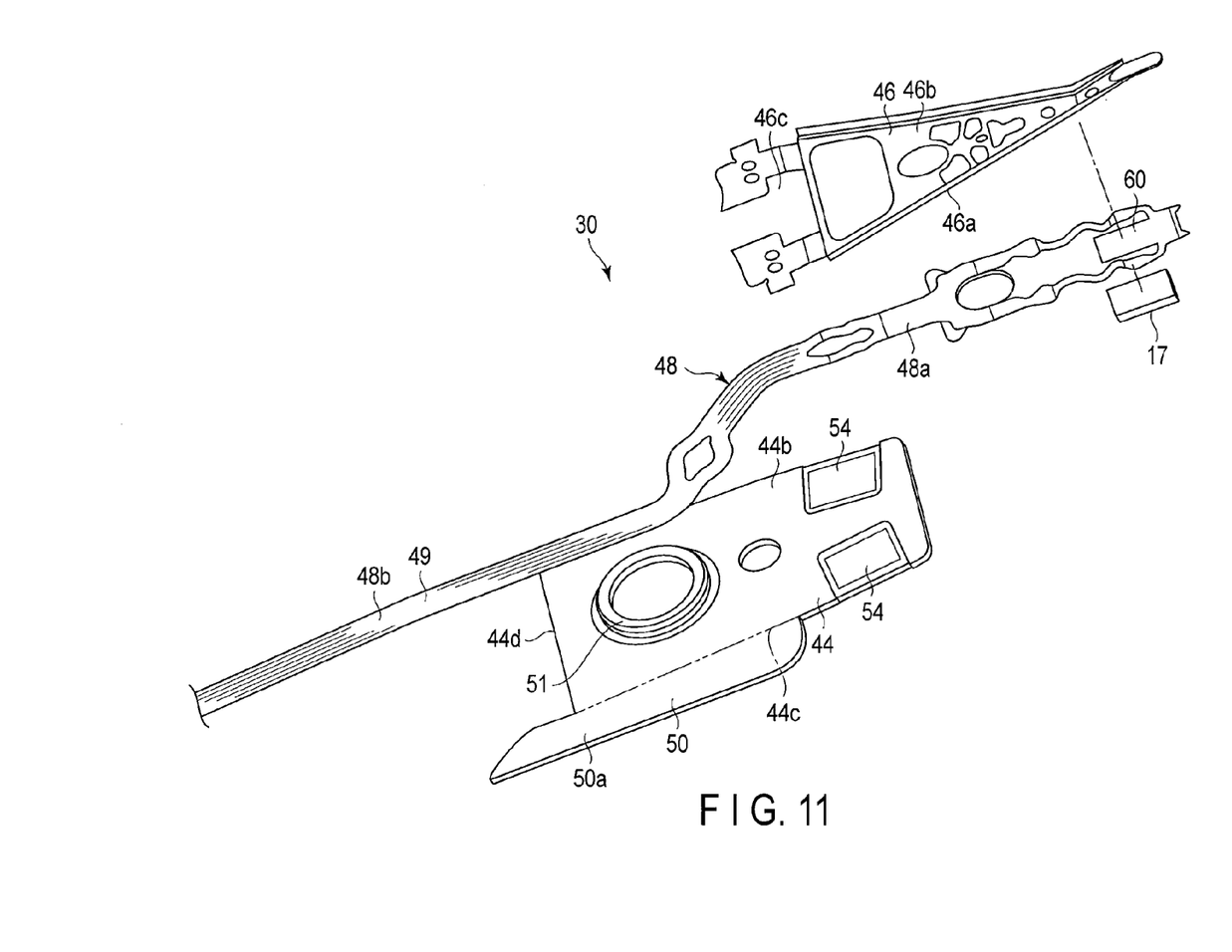
FIG. 11 is an exploded perspective view showing the suspension assembly.
Figure 12:
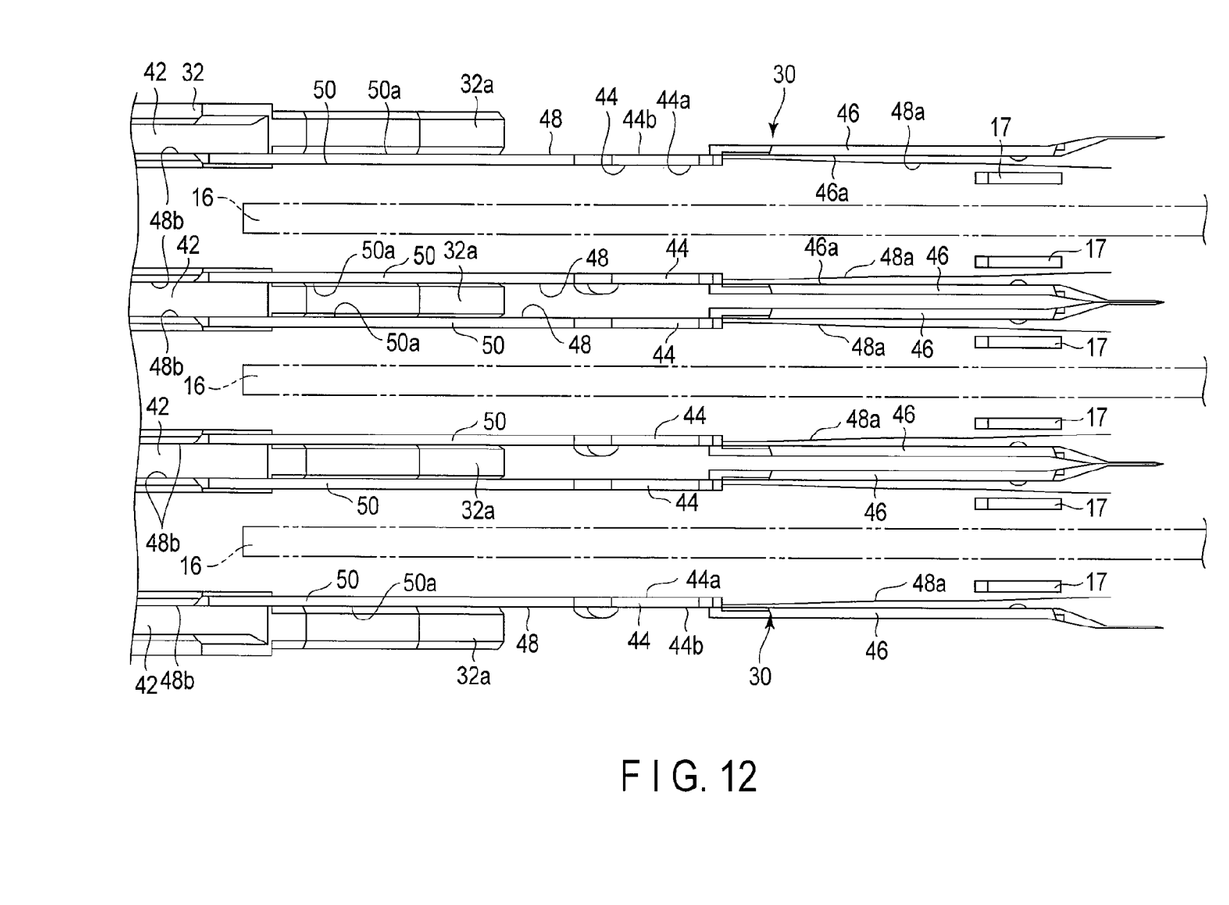
FIG. 12 is a side view showing a distal end portion of the arm of the HSA and a suspension assembly.
Figure 13:
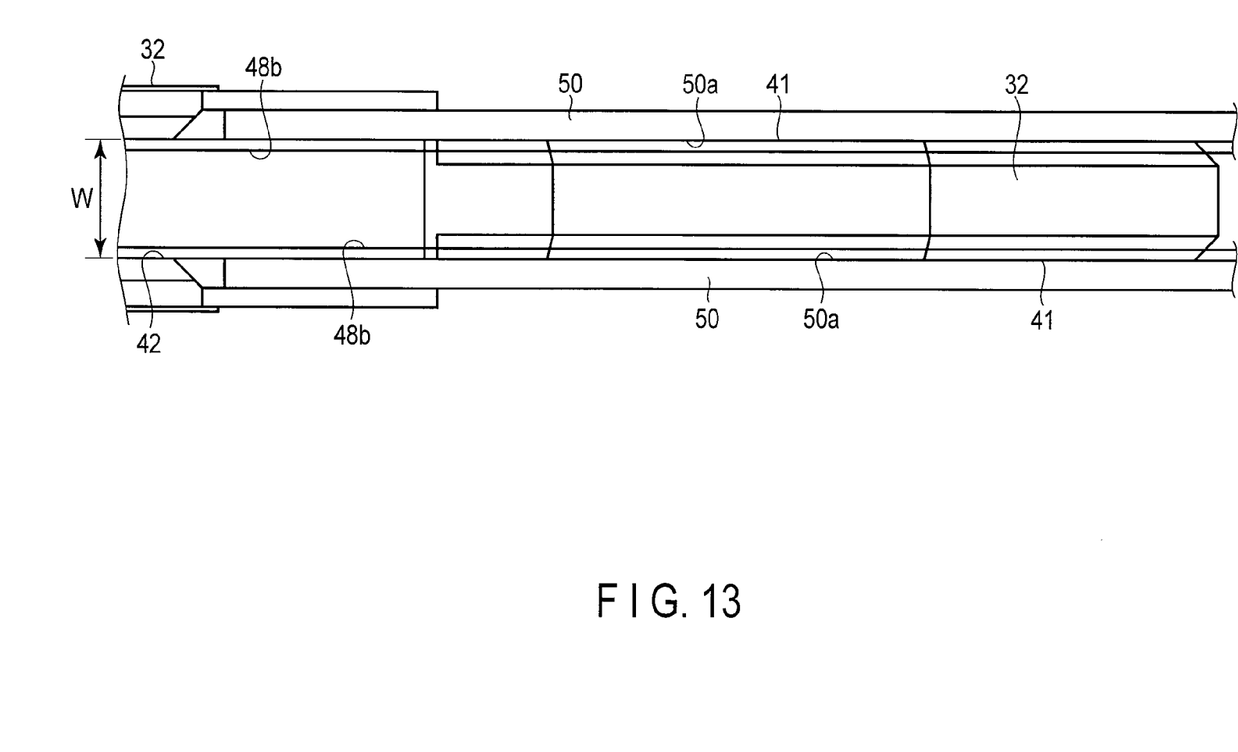
FIG. 13 is an enlarged side view showing a positional relationship between a securing plate portion of the suspension assembly and a slot of the arm.

FIG. 10 is a perspective view showing a distal end portion of an arm of a head stack assembly (HSA), and a suspension assembly, in the HDD of the Second Embodiment. FIG. 11 is an exploded perspective view showing the suspension assembly. FIG. 12 is a side view showing a distal end portion of the arm of the HSA and a suspension assembly. FIG. 13 is an enlarged side view showing a positional relationship between a securing plate portion of the suspension assembly and a slot of the arm.

The Second Embodiment is different from the First Embodiment, with respect to positions of a load beam and a flexure attached to a base plate 44, in a suspension assembly 30. More specifically, in the Second Embodiment, the suspension assembly 30 of the HSA 22 comprises a substantially rectangular base plate 44, a load beam 46 formed of an elongated leaf spring, and a flexure (wiring member) 48 shaped in an elongated band, as shown in FIG. 10 and FIG. 11. The load beam 46 has its proximal end portion superposed and secured on an end portion of the base plate 44. The load beam 46 extends from the base plate 44 and is formed to taper toward an extension end. The base plate 44 and the load beam 46 are formed of, for example, stainless steel. The base plate 44 has a thickness of, for example, 150 μm and the load beam 46 has a thickness of, for example, 25 to 30 μm.

The base plate 44 has a first surface 44a opposed to a magnetic disk 16, and a second surface 44b serving as a securing surface at a side opposite to the first surface. The base plate 44 also has a side edge 44c and a rear edge 44d. The base plate 44 comprises a circular opening at its proximal end portion, and an annular protruding portion 51 positioned around a periphery of the opening, and the protruding portion 51 protrudes from the second surface 44b of the base plate 44. The base plate 44 has the second surface 44b side of its proximal end portion superposed on a seat surface 41 of a distal end portion 32a of the arm 32. Furthermore, the base plate 44 is fastened to the distal end portion 32a of the arm 32 by fitting the protruding portion 51 of the base plate 44 in a swaging hole 40 formed at the arm 32 and by swaging the protruding portion 51. The first surface 44a of the base plate 44 is positioned at a side opposite to the surface of the magnetic disk 16.

The base plate 44 integrally comprises an elongated securing plate portion 50 protruding from the side edge 44c. The securing plate portion 50 extends along the side edge 44c, and protrudes toward the arm 32 side over the rear edge 44d of the base plate 44. In the present embodiment, the securing plate portion 50 comprises a support surface 50a which is formed to be flat and which extends in the same plane as the second surface 44b of the base plate 44. The support surface 50a extends substantially parallel to the second surface 44b, and also extends to a direction opposite to the load beam 46 over the rear edge 44d of the base plate 44.

The load beam 46 has a first surface 46a opposed to the magnetic disk 16 and a second surface 46b at a side opposite to the first surface. In the present embodiment, a proximal end portion of the load beam 46 is arranged to have the first surface 46a side superposed on the second surface 44b side of the distal end portion of the base plate 44, and is fixed to the base plate 44 by welding a plurality of portions of the proximal end portion. A width of the proximal end portion of the load beam 46 is formed to be substantially equal to a width of the base plate 44. An opening 46c is formed at a center of the proximal end portion of the load beam 46, and the proximal end portion of the load beam 46 is bifurcated. In addition, the load beam 46 is partially superposed on both end portions in the longitudinal direction of piezoelectric elements 54 and is bonded to the piezoelectric elements 54 by an adhesive, etc.

The flexure 48 serving as a wiring member comprises a distal side portion 48a attached onto the first surface 46a of the load beam 46 and onto the second surface 44b of the base plate 44, and a proximal side portion 48b which extends outwardly from the side edge 44c of the base plate 44 and which extends to the proximal end portion of the arm 32. The flexure 48 comprises a gimbal portion (elastic support portion) 60 at its distal end portion, and a magnetic head 17 is mounted on the gimbal portion 60. Wiring traces 49 of the flexure 48 are electrically connected to the magnetic head 17. In addition, some of the wiring lines 49 are electrically connected to the piezoelectric elements 54.

The distal side portion 48a of the flexure 48 is bonded or pivot-welded on the first surface 46a of the load beam 46. In addition, the distal side portion 48a extends over the second surface 44b of the base plate 44 through the opening 46c of the load beam 46 and is bonded or pivot-welded on the second surface 44b. The proximal side portion 48b of the flexure 48 extends outwardly from the side edge 44c of the base plate 44, and extends toward the arm 32 side along the support surface 50a of the securing plate portion 50. The proximal side portion 48b may be bonded or spot-welded on the support surface 50a.

The HSA 22 comprises six suspension assemblies 30 as shown in FIG. 12. The base plate 44 of the uppermost suspension assembly 30 is secured to a seat surface 41 at a lower surface side of the distal end portion 32a of the uppermost arm 32. The base plates 44 of the suspension assemblies 30 are secured to both upper and lower seat surfaces 41 of the distal end portion 32, respectively, at each of the second and third upper arms 32. Furthermore, the base plate 44 of the suspension assembly 30 is secured to the seat surface 41 at the upper surface side of the distal end portion 32a of the lowermost arm 32. In each suspension assembly 30, the second surface 44b of the base plate 44 is secured to the seat surface 41 of the distal end portion 32a.

Six suspension assemblies 30 extend from four arms 32, and are arranged side by side, so as to face substantially parallel to each other, with predetermined intervals. The suspension assembly 30 secured to the uppermost arm 32 and the suspension assembly 30 secured to the upper seat surface 41 of the second upper arm 32 are positioned parallel to each other with a predetermined interval, and the magnetic heads 17 supported on the respective suspension assemblies 30 are positioned to face each other. The magnetic heads 17 are positioned to face both surfaces of the magnetic disk 16.

The suspension assembly 30 secured to the lower seat surface 41 of the second arm 32 and the suspension assembly 30 secured to the upper seat surface 41 of the third arm 32 are positioned parallel to each other with a predetermined interval, and the magnetic heads 17 supported on the respective suspension assemblies are positioned to face each other. The magnetic heads 17 are positioned to face both surfaces of the magnetic disk 16.

The suspension assembly 30 secured to the lower seat surface 41 of the third arm 32 and the suspension assembly 30 secured to the upper seat surface 41 of the lowermost arm 32 are positioned parallel to each other with a predetermined interval, and the magnetic heads 17 supported on the respective suspension assemblies are positioned to face each other. The magnetic heads 17 are positioned to face both surfaces of the magnetic disk 16.

As shown in FIG. 10, FIG. 12, and FIG. 13, the support surface 50a of the securing plate portion 50 is extended to a close vicinity of the slot 42 of the arm 32 and is positioned substantially parallel to the slot 42, sequentially with the slot 42, while the base plate 44 is secured to the distal end portion 32a of the arm 32. Furthermore, the support surface 50a is positioned at a height which falls within a range of a width W of the slot 42.

The proximal side portion 48b of the flexure 48 is led into the slot 42 of the arm 32 over the support surface 50a. The proximal side portion 48b of the flexure 48 extends to the proximal end of the arm 32 through the slot 42 of the arm 32.

According to the Second Embodiment constituted as described above, the flexures 48 are positioned to be opposed to each other, at two adjacent suspension assemblies 30, by changing the attachment surface of the load beam 46 and the flexure 48 on the base plate 44 to the second surface 44b which is an opposite side to the magnetic disk 16. As shown in FIG. 13, for example, at two suspension assemblies 30 attached to the upper and lower seat surfaces of the distal end portion 32a of the second or third arm 32, the flexures 38 of the respective suspension assemblies are positioned between two securing plate portions 50 facing each other and are opposed to each other. Since the flexures 48 are close to each other, two flexures 48 can be easily inserted into the slot 42 even if the width W of the slot 42 formed in the arm 32 is small. Thus, the slot 42 for wind shield can be narrowed and can be further shaped to receive no influence from wind.

The portion of each flexure 48, which extends outwardly from the base plate 44, is opposed to the support surface 50a and is led to the slot 42 along the support surface 50a. The securing plate portion 50 thereby functions as a wind shield for the portion of the flexure 48 which extends from the surface of the base plate 44 into the slot 42, and also functions as a guide which guides the flexure 48 to the slot 42 of the arm 32. By removing a gap between the support surface 50a of the securing plate portion 50 and the slot 42, an aerial wiring portion does not need to be provided and a wind influence on the flexures 48 from the rotating magnetic disks can be reduced. Degradation of the positioning accuracy of the magnetic head resulting from vibration of the flexure can be thereby prevented.

According to the Second Embodiment, based on the above, the suspension assembly and disk device capable of suppressing the rocking of the wiring member caused by the wind disturbance and of attempting the increase in positioning accuracy of the head can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the above-described embodiments, the magnetic disks may not only be formed in a size of 2.5 inches, but also in the other size. The number of the magnetic disks is not limited to three, but may be one or two, and the number of suspension assemblies may also be increased or decreased according to the number of the mounted magnetic disks.

What is claimed is:
1. A suspension assembly comprising:
a base plate comprising a first surface, a second surface opposite to the first surface, a side edge, and a securing plate portion protruding outwardly from the side edge, the securing plate portion being formed in a stepped shape to be bent to the second surface side along the side edge, and including a support surface displaced to the second surface side and extending substantially parallel to the first surface;
a load beam comprising a proximal portion secured on the first surface of the base plate, and extending from the base plate; and a wiring member comprising a plurality of wiring lines electrically connectable to a head, a distal side portion attached to the load beam and the first surface of the base plate, and a proximal side portion extending outwardly from the side edge of the base plate and extending in a direction opposite to the load beam along the support surface, wherein the base plate comprises a rear edge positioned at a side opposite to the load beam, and the support surface of the securing plate portion extends in a direction opposite to the load beam over the rear edge.

2. The suspension assembly of claim 1, wherein
the proximal side portion of the wiring member is tilted and extended from the first surface of the base plate to the support surface of the securing plate portion, and is positioned to be opposed to the support surface.

3. The suspension assembly of claim 1, wherein
the securing plate portion is formed by folding a part of the base plate in a bent shape.

4. A disk apparatus comprising:
a disk storage medium;
the suspension assembly of claim 1; and
a magnetic head supported on the suspension assembly and configured to process information on the storage medium.

5. The disk apparatus of claim 4, wherein
the proximal side portion of the wiring member is tilted and extended from the first surface of the base plate to the support surface of the securing plate portion, and is positioned to be opposed to the support surface.

6. The disk apparatus of claim 4, wherein
the securing plate portion is formed by folding a part of the base plate in a bent shape.

7. The disk apparatus of claim 4, further comprising an actuator comprising an arm provided to be rotatable, and wherein the arm comprises a distal end portion including a seat surface, and a slot extending from the distal end portion to a proximal portion of the arm along a side edge of the arm, the base plate of the suspension assembly comprises the second surface secured on the seat surface of the distal end portion of the arm, the support surface of the securing plate portion extends to the slot of the arm and is positioned at a height which falls within a width of the slot, and the proximal side portion of the wiring member extends into the slot of the arm along the support surface.

8. The disk apparatus of claim 7, wherein
the proximal side portion of the wiring member is tilted and extended from the first surface of the base plate to the support surface of the securing plate portion, and is positioned to be opposed to the support surface.

9. The disk apparatus of claim 7, wherein
the securing plate portion is formed by folding a part of the base plate in a bent shape.

* * * * *